Feb. 21, 1967    H. N. GRILLOT    3,305,257
NOTCHED DISK CORD HOLDER
Filed April 14, 1965    2 Sheets-Sheet 1

INVENTOR
HOMER N. GRILLOT
BY
Ralph Alvey
ATT'Y.

Feb. 21, 1967  H. N. GRILLOT  3,305,257
NOTCHED DISK CORD HOLDER
Filed April 14, 1965  2 Sheets-Sheet 2
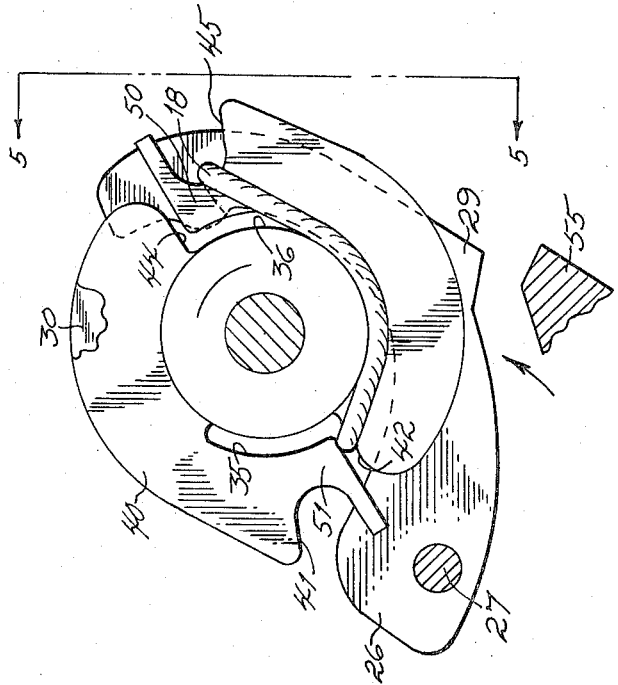
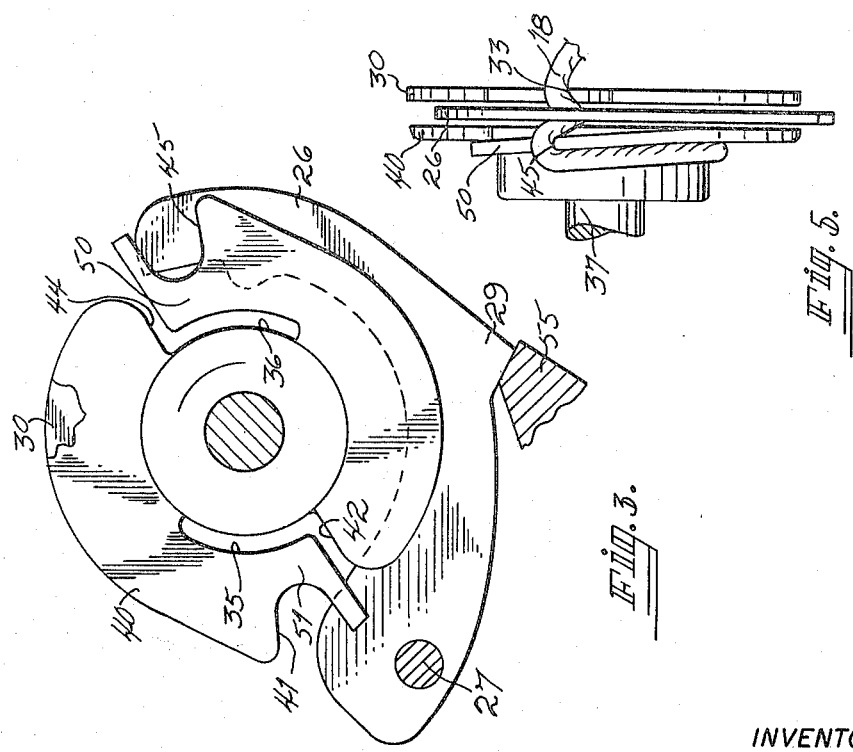
INVENTOR
HOMER N. GRILLOT
BY
Ralph Alwey
ATT'Y.

United States Patent Office 3,305,257
Patented Feb. 21, 1967

3,305,257
NOTCHED DISK CORD HOLDER
Homer N. Grillot, Naperville, Ill., assignor to International Harvester Company, Chicago, Ill., a corporation of Delaware
Filed Apr. 14, 1965, Ser. No. 448,124
10 Claims. (Cl. 289—14)

This invention relates to a twin disk cord holder for a baler twine binding mechanism. In particular, the rear disk of the cord holder includes novel means for keeping an effective grip on the twine regardless of wear of the cord holder, or variations in the thickness of the twine strand, or manufacturing variations in the space between the disks.

Wear of the disks and keeper blade of a cord holder is caused by the repeated rubbing of twine across the surfaces of these parts and by the abrasive action of foreign matter in the hay being baled. Because the spacing between the disks and the keeper blade is fixed, wear of these parts renders them less able to grip the twine. Hay being forced against the twine by the baler plunger is therefore able to pull the twin loose from the cord holder and cause a mis-tie.

Variations in the thickness of the twine strand exist in any one ball of twine and between different commercial grades of twine. In the case of such variations, the fixed spacing between the cord holder disks and the keeper blade either causes a mal-function of the cord holder or prevents the ready use of another grade of twine. When the thickness of the twine in a ball varies, undersize twine pulls loose from the cord holder; while oversize twine jams in the cord holder and breaks when pulled on. For different commercial grades of twine, the spacing of the cord holder disks must be adjusted by the addition or subtraction of shims according to the caliper of the twine.

The cord holder forming this invention is able to exert an effective grip on the twine regardless of wear of the cord holder parts, differences in caliper of various commercial grades of twine, and inherent variations in the thickness of the strand of twine in a ball. This versatility is obtained by use of an arcuate spring slot extending from the root of each narrow twine slot of the rear cord holder disk. The arcuate spring slot allows a portion of the rear disk to flex in response to a force acting normal thereto.

Objects

Various objects are attained with the present cord holder. A principal object is to provide a cord holder able to function properly under a greater variety of adverse operating conditions. Another principal object is to provide a versatile cord holder able to use different commercial grades of twine without adding or removing shims. Another object in this regard is to provide a cord holder wherein there is less need to remove shims from between the cord holder disks to compensate for wear of the cord holder parts. A further object is to provide a cord holder able to adjust to variations in the thickness of a twine strand. An additional object is to provide a cord holder having a longer life because of its greater tolerance for wear of the cord holder parts. Other objects include the provision of a cord holder capable of handling both shipper grade and standard grade twine without resetting of the cord holder parts, and the provision of a cord holder that does not damage oversize twine.

Drawings

The best mode contemplated for carrying out this invention is shown in the drawings, where:

FIG. 3 is a view of the rear side of the cord holder unit of FIG. 1 along a line of sight normal to the disks, showing the location of the novel spring slots on the rear disk;

FIG. 4 is a view similar to FIG. 3, showing the bale-end of a strand of twine gripped in the cord holder; and FIG. 5 is a section taken on line 5—5 of FIG. 4, showing the rear cord holder disk flexed by oversized twine.

Description

Figure 1:
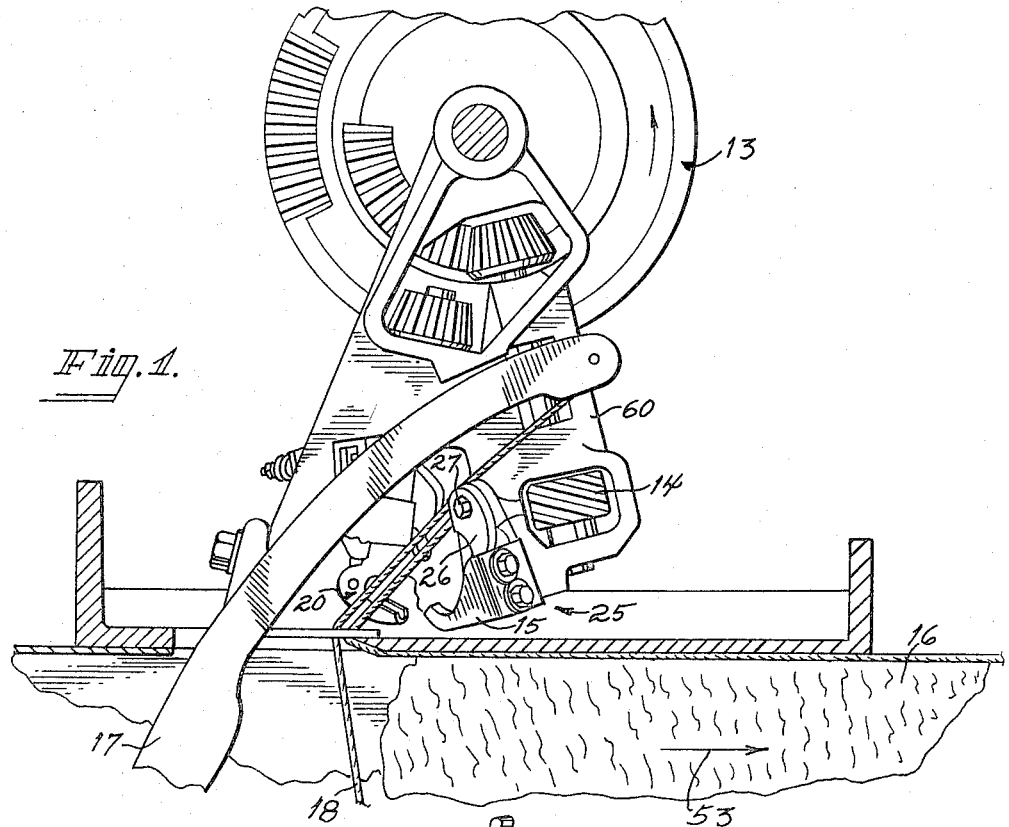
FIG. 1 is a side elevation of a knotter assembly mounted on the top side of the baling chamber of a hay baler.

A typical binding mechanism for a baler comprises (FIG. 1) a needle 17 for passing twine 18 around a bale 16 to a cord holder 25, a bill-hook assembly 20 for forming a knot in the twine, and a mechanism 13 for driving the knotter unit. As binding mechanisms in general are old (see U.S. Patent No. 3,101,963), only the novel portions of cord holder 25 will be described in detail here.

The cord holder unit 25 (FIGS. 1–2) holds the twine while bale 16 is being formed and bound. The cord holder assembly shown is a two-stage, twin-disk device and comprises (FIG. 2), a pair of cord holder disks 30 and 40, a keeper blade 26, a twine-end cleaner 19, and a drive shaft 37 carrying a gear 38.

The parts of the cord holder unit 25 (FIG. 2) are assembled in the following manner: Shaft 37 is journalled in a bearing in frame 60, the gear 38 on shaft 37 meshing with a gear 14 of the drive mechanism 13. Rear disk 40 which is pinned onto shaft 37, has a hub 43 on its face, the periphery of which serves as a seat for the front disk 30 and the twine end cleaner 19. The twine end cleaner 19 extends between the two disks 30 and 40 and has at its inner end a crescent-shaped portion that fits around the diameter of the hub 43 of the rear disk. Any fragments of twine that wind around the hub are removed by cleaner 19 as the hub rotates past the points of the crescent-shaped end. Shim 46 (discussed below) placed on the face of hub 43, provides a seat for the front disk 30, which is fastened to the hub 43 by screws (not shown). Keeper blade 26, pivoted on pin 27, extends around the hub of the rear disk on the side thereof opposite cleaner 19. Pivoting action of the keeper blade about pin 27 is limited inwardly by the hub 43 of the rear disk and outwardly by abutment 55 (FIG. 3) on frame 60. Projection 28 towards the outer end of the keeper blade imposes a holding action (discussed below) on the twine 18.

Figure 2:
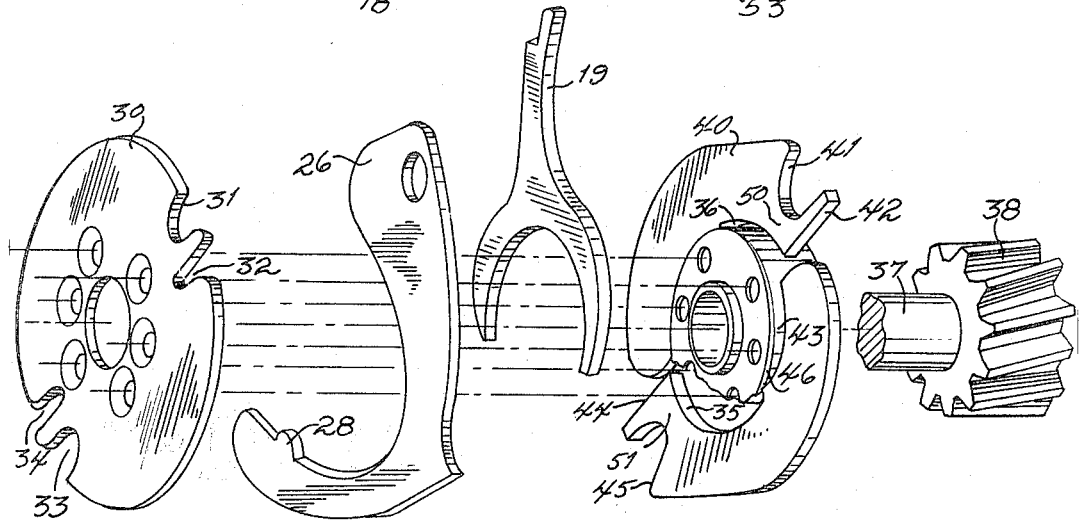
FIG. 2 is an exploded view of the cord holder unit of the knotter assembly of FIG. 1.

Front disk 30 and rear disk 40 (FIG. 2) have two pairs of radial twine slots formed in their peripheries. Each pair of twine slots consist of a narrow slot (32, 34, 42, 44) for holding the bale end of the twine while a bale is being formed, and a wide slot (31, 33, 41, 45) for receiving the needle end of the twine on completion of a bale. Slots 31, 33, 41 and 45 are made wider and shallower than the slots 32, 34, 42, 44 to facilitate laying of the twine in the slots by needle 17. The shallowness of the wide slots holds the twine in reach of knife 15 (FIG. 1). A pair of twine slots on the front disk and its companion pair of twine slots on the rear disk plus the remaining set of wide slots constitutes a cord holding stage, that is, the twine slots utilized in a single baling cycle. Thus, twine slots 31, 32, 41 and 42 and wide slots 33 and 45 represent one stage; and twine slots 33, 34, 44 and 45 and wide slots 31 and 41 represent a second stage.

Spring slots 35 and 36 in rear disk 40 (FIG. 3) form spring sections 50 and 51, which have the qualities of a leaf spring and exert a gripping action on the tail end of the twine. The spring characteristics of sections 50 and 51 depend upon the type of metal used for the rear disk, the thickness of the rear disk, the length of the spring slot, and the like. Spring slots 35 and 36 extend laterally from the roots of the narrow slots 42 and 44, respectively, around the hub of the rear disk at a point below the adjacent wide slots 41 and 45, thus segregating each of the wide slots 41 and 45 in a cantilevered section of disk 40. In lieu of the arcuate spring slots shown, straight slots can also be used. Because of the relatively involved configuration of the spring slots, rear disk 40 of the preferred mode is made by an investment casting process.

The shim 46 is selected according to the amount of space or clearance desired between the keeper blade 26 and the disks 30 and 40. Thus, shim 46 may be of such thickness that the clearance between the keeper blade and the disks provides a firm grip on the smallest twine. With this setting the cord holder can generally be used with all calipers of baling twine, since the spring sections 50 and 51 will deflect to accommodate the twines of greater caliper as well as oversize portions of the smallest twine. On the other hand, if a particular caliper of twine is to be used at all times, shim 46 can be selected to provide clearance appropriate for that particular twine. When shim 46 is selected, allowance can be made for wear of the cord holder parts by using a proportionately thinner shim.

Operation

The cord holder operates as follows: Bale 16 (FIG. 1) is formed by successive charges of hay packed by the baler plunger (not shown) and forced to the rear of the baler in the direction of the arrow 53. During this time, needle 17 is out of view. The tail end of twine 18 (FIG. 5) extends from twine slot 33 of front disk 30 under keeper blade 26, through twine slot 45 (FIG. 4), along the rear surface of disk 40, through twine slot 42 and past the keeper blade 26, through twine slot 32 on front disk 30 (FIG. 2), to the baling chamber (FIG. 1). In the baling chamber, the twine extends along the top of the bale 16, down the far end of the bale (not shown), back along the bottom of the bale (not shown), to the needle 17. Where the twine passes through twine slots 33 and 45 (FIG. 5), it jams against projection 28 on keeper blade 26, which kinks the twine. Keeper blade 26 is locked at this time, the twine in slots 33 and 45 having swung the blade about pivot pin 27, to an "over center" position whereby the force components are so arrayed as to lock the keeper blade in the position of FIG. 4. The twine, being larger than the space between the cord holder parts, also wedges between the disks and the keeper blade.

On completion of the bale, needle 17 (FIG. 1) delivers twine to the side cord holder twine slots 31 and 41 (FIG. 2), to complete the loop of twine around the bale. The cord holder disks then rotate counterclockwise (FIGS. 3–4) and move twine past projection 28 on keeper blade 26 (FIG. 4), unlocking the keeper blade and freeing the twine, so that it can be worked by the billhook. This last-mentioned rotation of the disks 30 and 40 also moves both strands of twine within reach of the billhook assembly 20 (FIG. 1), which rotates and forms a knot in the twine. Further rotation of the disks 30 and 40 moves the twine past twine knife 15 (FIG. 1), which cuts the twine and frees the bound bale from the twine supply. Movement of the bale towards the rear of the baling chamber causes the knot to move off the billhook. With further rotation of the disks 30 and 40, needle 17 executes its return stroke and delivers twine to narrow twine slots 34 and 44 (FIG. 2), the cord holder coming to rest in its bale-forming position (FIG. 4).

Assuming that the clearance between the disks and the keeper blade has been selected for a particular caliper of twine and that the twine thickness remains uniform, the leaf spring sections 50 and 51' of the cord holder disk flex (e.g., 0.020 inch) in gripping the twine. When the twine thickness increases for one reason or another, the spring section 50 or 51 of the rear disk flexes (FIG. 5) to accommodate the twine and prevent it from being cut by the cord holder. As the cord holder parts wear, the spring sections flex less than before but still exert a suitable grip on the twine because of the provision made for wear in selecting shim 46.

While only the preferred mode of the present invention has been described, the invention is by no means limited to that mode, but embraces, as well, all equivalent forms that fall within the spirit and scope of the attached claims. Specific details, where described, are intended as illustrations only and not as limitations of the invention.

I claim:

1. A cord holder disk, comprising: a disk, a cord holding slot radiating outwardly in said disk to the periphery thereof, said slot having a root, a spring slot in said disk below said root of said cord holding slot and extending to the periphery of said disk.

2. A cord holder disk, comprising: a disk, a cord holding stage formed in said disk, said cord holding stage including a radially disposed bale end twine slot in the periphery of said disk and a separate, radially disposed, needle end twine slot in the periphery of said disk adjacent to said bale end twine slot; and a spring slot in said disk adjacent said needle end twine slot, said spring lot segregating said needle end slot in a cantilevered section of said disk.

3. A cord holder disk, as recited in claim 2, wherein: said spring slot extends laterally from said bale end twine slot and under said needle end twine slot.

4. A cord holder disk, as recited in claim 3, wherein said spring slot has an arcuate configuration and joins to said bale end twine slot at the root thereof.

5. A cord holder disk, as recited in claim 2, wherein: said disk contains two of said cord holding stages located at diametrically opposed points on the periphery of said disk.

6. A twin disk cord holder unit, comprising: a frame, a shaft journalled in said frame, a pair of cord holding disks mounted in parallel spaced relation on said shaft for joint rotation therewith, a keeper blade pivotally mounted on said frame and projecting into the space between said disks, a cord holding stage formed in one of said disks, said cord holding stage including a radially disposed bale end twine slot in the periphery of said disk and a separate, radially disposed, needle end twine slot in the periphery of said disk adjacent to said bale end twine slot; and a spring slot in said disk adjacent said needle end twine slot, said spring slot segregating said needle end slot in a cantilevered section of said disk.

7. A twin disk cord holder unit, as recited in claim 6, wherein: one of said disks is a front disk and the other of said disks is a rear disk, and said cord holding stage is formed in said rear disk.

8. A twin disk cord holder unit, as recited in claim 7, wherein: said rear disk contains two of said cord holding stages at diametrically opposed points on the periphery of said disk.

9. A twin disk cord holder unit, as recited in claim 8, wherein: said spring slots extend laterally from their respective bale end twine slots under the respective needle end twine slots.

10. A twin disk cord holder unit, as recited in claim 9, wherein: said spring slots have an arcuate configuration and are joined to their respective bale end twine slots at the respective roots thereof.

References Cited by the Examiner
UNITED STATES PATENTS 3,215,460  11/1965  Bledsoe et al. _____ 289—14
3,232,652   2/1966  Bonga _____ 289—14

MERVIN STEIN, *Primary Examiner.*

L. K. RIMRODT, *Examiner.*